United States Patent
Langberg et al.

(10) Patent No.: US 7,400,693 B2
(45) Date of Patent: Jul. 15, 2008

(54) SYSTEM AND METHOD OF ECHO CANCELLATION

(75) Inventors: Ehud Langberg, Ocean, NJ (US); Lujing Cai, Morganville, NJ (US); Albert Rapaport, Morganville, NJ (US)

(73) Assignee: Conexant Systems, Inc., Red Bank, NJ (US)

( * ) Notice: Subject to any disclaimer, the term of this patent is extended or adjusted under 35 U.S.C. 154(b) by 0 days.

(21) Appl. No.: 11/197,524

(22) Filed: Aug. 5, 2005

(65) Prior Publication Data

US 2006/0114976 A1    Jun. 1, 2006

Related U.S. Application Data

(60) Provisional application No. 60/631,140, filed on Nov. 29, 2004.

(51) Int. Cl.
*H03D 1/04* (2006.01)
(52) U.S. Cl. .................. 375/346; 375/219; 375/222; 370/286
(58) Field of Classification Search .......... 375/219, 375/220, 222, 224, 285, 346; 370/282, 286, 370/287, 288, 289, 290, 291, 292; 379/406.1
See application file for complete search history.

(56) References Cited

U.S. PATENT DOCUMENTS

| | | | | |
|---|---|---|---|---|
| 5,889,857 A | * | 3/1999 | Boudy et al. | 379/406.14 |
| 2001/0036261 A1 | * | 11/2001 | Prendergast et al. | 379/398 |
| 2003/0091133 A1 | * | 5/2003 | Redfern et al. | 375/348 |
| 2004/0184519 A1 | * | 9/2004 | Melsa et al. | 375/222 |
| 2004/0233979 A1 | * | 11/2004 | Fisher et al. | 375/222 |

OTHER PUBLICATIONS

Debbasch et al (Modified Flexible Bandplan 998 for Variable Rate Symmetric VDSL Applications, May 12-15, 2003).*

* cited by examiner

*Primary Examiner*—Chieh M. Fan
*Assistant Examiner*—Jaison Joseph
(74) *Attorney, Agent, or Firm*—Thomas, Kayden, Horstemeyer & Risley LLP

(57) ABSTRACT

An economic low-complexity system and method for echo cancellation are disclosed. The system and method are particularly suited for multi-carrier VDSL using the U0 band. The techniques taught herein may be implemented in VDSL and VDSL2 systems and used to receive signals in three bands (e.g., U0, U1 and U2) simultaneously.

29 Claims, 2 Drawing Sheets

111# SYSTEM AND METHOD OF ECHO CANCELLATION

CROSS-REFERENCE TO RELATED APPLICATIONS

The present application claims priority to U.S. Provisional Patent Application No. 60/631,140 to Langberg et al. entitled "System and Method of Echo Cancellation," the disclosure of which is incorporated by reference herein in its entirety.

The present application is related to the following patents and applications: U.S. Pat. No. 6,421,377, to Langberg et al. entitled "System and Method for Echo Cancellation Over Asymmetric Spectra," U.S. patent application Ser. No. 10/020,172, to Karkas et al., entitled "Method and System for Implementing a Reduced Complexity Dual Rate Echo Canceller," U.S. patent application Ser. No. 10/020,135, to Sang et al., entitled "Method and System for Implementing Weighted Vector Error Echo Cancellers," U.S. patent application Ser. No. 10/020,134, to Halder et al., entitled "Method and System for Implementing a Reduced Complexity Dual Rate Echo Canceller," and U.S. patent application Ser. No. 10/050,128, to Graziano et al., entitled "Method and System for Varying an Echo Canceller Filter Length Based on Data Rate." The disclosures of the above patents and applications are expressly incorporated by reference herein in their entireties.

FIELD OF THE INVENTION

The present invention generally relates to a cost-effective system and method of echo cancellation. More particularly, the present invention relates to echo cancellation that is suited for use in, e.g., a multi-carrier very-high-data-rate digital subscriber line system using the International Telecommunication Union U0 band.

BACKGROUND OF THE INVENTION

Very-High-Data-Rate Digital Subscriber Line (VDSL) is a bi-directional data transmission technology. Orthogonality of upstream versus downstream signals generally helps to mask echo. However, the orthogonality of downstream and upstream is difficult to maintain when the U0 band (e.g., 25 kHz-138 kHz) is utilized for data transmission to boost rate performance for longer loops. Thus, echo from upstream typically generates interference downstream in the customer side. Further, VDSL upstream and downstream typically employ a very wide-frequency bandwidth. Echo cancellation in such high bandwidth environments is generally very computationally expensive.

The International Telecommunications Union defines the Very-High-Data-Rate Digital Subscriber Line 2 standard (VDSL2) in a document entitled ITU-T G.993.2. Although this standard permits simultaneous reception of U0, U1, and U2 bands, it gives no technical details as to how such a reception may actually be implemented.

BRIEF DESCRIPTION OF THE DRAWINGS

The purpose and advantages of the present invention will be apparent to those of ordinary skill in the art from the following detailed description in conjunction with the appended drawings.

DETAILED DESCRIPTION OF THE INVENTION

The following description is intended to convey an understanding of the present invention by providing specific embodiments and details involving echo cancellation. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
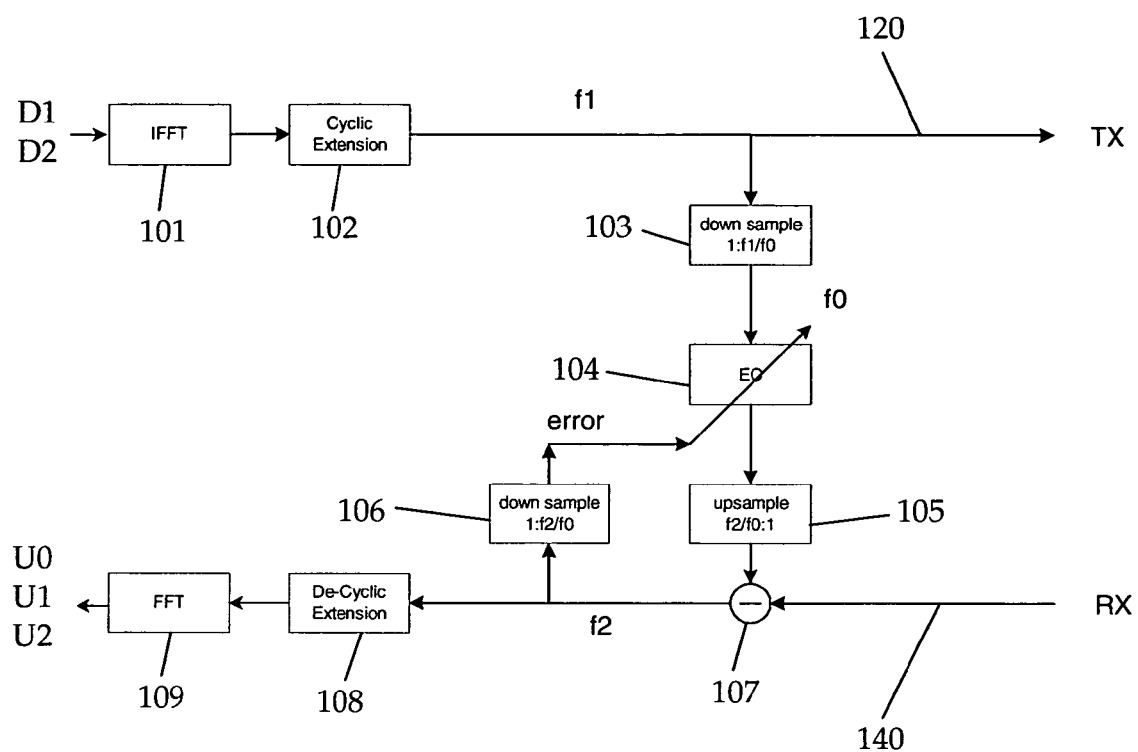
FIG. 1 is a schematic diagram of an embodiment of the present invention.

FIG. 1 is a schematic diagram of an embodiment of the present invention. The output sampling frequency of Inverse Fast Fourier Transform (IFFT) block 101 is denoted by f1. This is the Nyquist frequency that covers twice the usable bandwidth. For a VDSL system, f1 is very high, generally ranging above 16 MHz. The maximum bandwidth of U0 is defined in the standard as either 138 kHz or 276 kHz. The Nyquist frequency of this U0 bandwidth is denoted by f0. The ratio of f1 to f0 is very large. To cancel the interference resulting from U0 only, it is sufficient to cancel echo on f0. Canceling echo only at f0 reduces complexity compared with conventional techniques and retains favorable echo cancellation net results. The transmit signal is carried on transmit channel 120. Coming from the output of IFFT block 101 and with cyclic extension added by cyclic extension block 102, the transmit signal serves as a reference signal for the echo canceller. This reference signal is down-sampled to f0 at downsampler block 103 to form the input to the echo canceller block 104. A low-pass filter with cutoff frequency at f0/2 is placed within the down-sampled block 103. This low-pass filter preferably has very strong suppression in its stopband.

Echo canceller block 104 has a Finite Impulse Response (FIR) structure with its coefficients adaptively adjusted by the error signal. Techniques for such adaptive coefficient adjustment include, by way of non-limiting example, Recursive Least Squares (RLS), Weighted Recursive Least Squares (WRLS), Least Mean Squares (LMS), Normalized Least Mean Squares (NLMS), and Kalman filtering.

The output of echo canceller block 104 is fed into up-sampling block 105 and converted to receive-sample frequency f2. This signal is considered the estimated echo and subtracted from the received signal carried on receive channel 140 at subtractor block 107. After subtraction at subtractor 107, the signal is fed to Fast Fourier Transform (FFT) block 109 as an echo-free received signal by way of de-cyclic extension block 109.

A feedback mechanism is used in conjunction with echo canceller block 104. To adaptively adjust the coefficients of echo canceller block 104, the error signal is generated by down-sampling the output of subtractor block 107 at down-sample block 106, such that the sample frequency is changed from f2 to f0. Adaptive algorithms including but not limited to the above (RLS, WRLS, LMS, NLMS, Kalman) may be used with this error signal to update the FIR coefficients in echo canceller block 104.

A low-pass filter with cutoff frequency f0/2 is applied in up-sample block 105 and down-sample block 106. Preferably, the low-pass filters in up-sample block 105, down-sample block 106, and down-sample block 103 are designed in such a way as to have similar frequency responses. In particular, the low-pass filters in up-sample block 105 and down-sample block 106 are preferably chosen to be identical.

If f1 is equal to f2, the low-pass filter in down-sample block 103 preferably has identical frequency response to that of the low-pass filters in up-sample block 105 and down-sample block 106.

Figure 2:
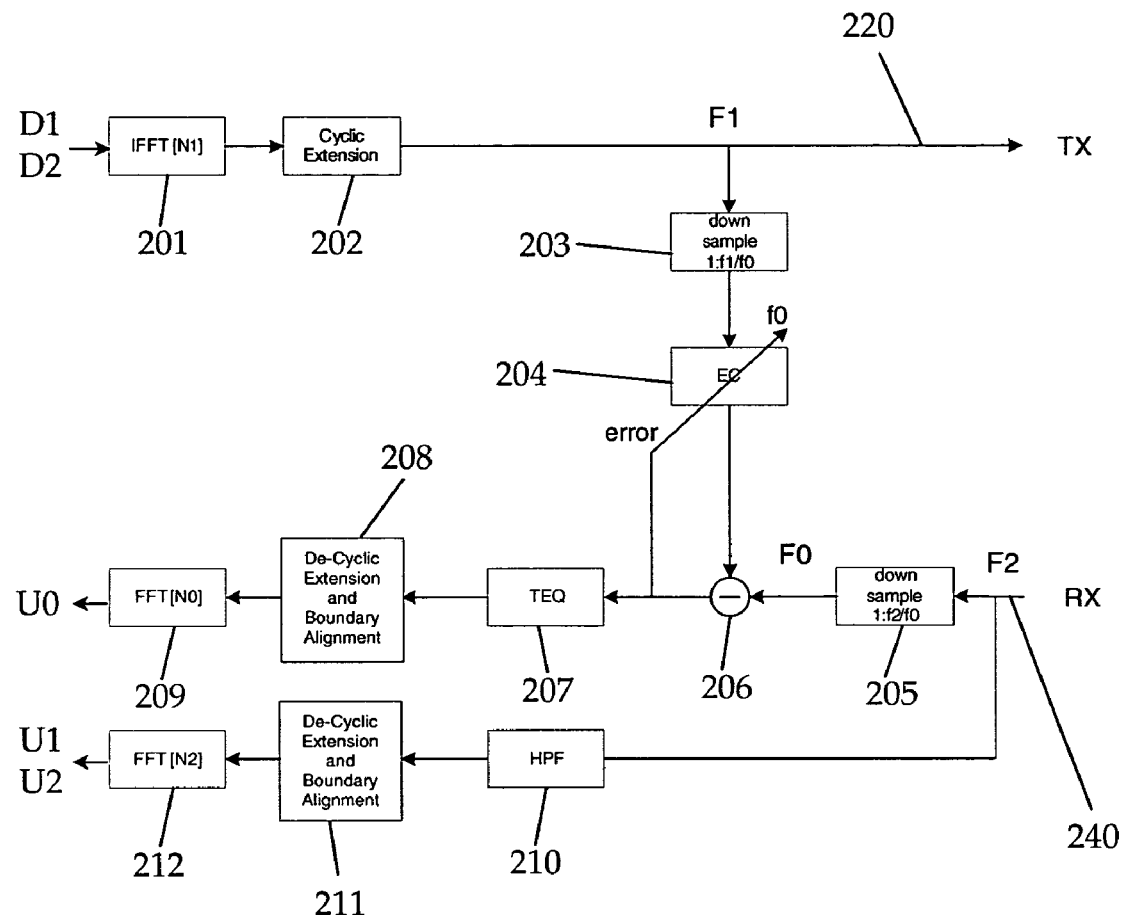
FIG. 2 is a schematic diagram of an embodiment of the present invention having a separate path for the U0 band.

Before turning to a detailed discussion of the embodiment of FIG. 2, a few words about the U0 band and digital duplexing are in order.

The U0 band is useful both alone and in combination with the U1 and/or U2 bands. In long loops, the U0 band avoids the associated strong loss over high frequencies that may prevent the use of U1 and U2 bands. The U0 band may be used as the sole receive band in such loops. For short and medium loops, the U0 band improves overall performance when used in conjunction with U1 and/or U2 bands. In sum, it is generally desirable for a receiver to be able to use the U0 band.

Digital duplexing is a technique for aligning receive and transmit signals so as to maintain orthogonality between them. Maintaining such orthogonality reduces errors and improves signal-to-noise. Digital duplexing also allows for narrower guard bands when implementing Frequency Division Duplexing (FDD), thereby increasing usable bandwidth. (FDD is a technique for using different frequencies, separated by guard bands, for transmit and receive.) However, digital duplexing is not always a preferred approach for all signals and bands. For example, implementing digital duplexing generally includes adding cyclic extensions to the signals. The added cyclic extensions generally reduce channel capacity due to signal redundancy.

Using cyclic extensions for relatively low-frequency signals presents further engineering hurdles. Relatively low-frequency signals are typically processed using one or more low-pass filters having a relatively long impulse response interval. In general, a channel impulse response should be smaller than the cyclic extension of a given symbol. Certain bands may typically have an impulse response larger than the associated cyclic extensions. Thus, cyclic extensions, and hence digital duplexing, cannot always be effectively used for all signals and bands. Note, however, that despite the drawbacks outlined in this paragraph and elsewhere, digital duplexing and/or cyclic extensions may be used in embodiments of the present invention. The embodiment of FIG. 2, for example, implements both digital duplexing and cyclic extensions in certain bands. By way of non-limiting example, cyclic extensions and digital duplexing may be implemented in the U1 and U2 bands.

Because the U0 band is located at very low frequencies (e.g., 25 KHz-138 KHz or 25 KHz-276 KHz), the impulse response for this band is typically relatively long compared to that of the U1 and U2 bands. Moreover, impulse response times of the filters and loops typically associated with the U0 band are, in some instances, too long for cyclic extensions to be implemented. As a result, digital duplexing is typically unavailable for the U0 band. Embodiments of the present invention may use other techniques to process the U0 band. As discussed herein in reference to FIG. 2, for example, an echo canceller and TEQ may be used to decode and ensure full performance in the U0 band. In such a configuration, the U1 and U2 bands may operate in digital duplex mode even though the U0 band does not.

FIG. 2 is a schematic diagram of an embodiment of the present invention configured for a multi-band transmitter and receiver, suitable for, by way of non-limiting example, VDSL and VDSL2. The embodiment of FIG. 2 is capable of receiving U0, U1 and U2 bands simultaneously. In this embodiment, the U0 band is processed using an echo canceller and a time domain equalizer (TEQ), while the U1 and U2 bands are processed using digital duplexing. The embodiment of FIG. 2 thus processes the U0 band independently from the U1 and U2 bands. The echo canceller embodiment of FIG. 2 has preferable properties when implemented in situations where there is very high ratio between transmit bandwidth and receive bandwidth, although its use is not limited to such situations.

In the embodiment of FIG. 2, the transmitted signal is carried on transmit channel 220. Block 201 represents the transmit modulator as an N1-point IFFT corresponding to a very large bandwidth, typically, but not necessarily, 17.66 MHz. By way of non-limiting example, N1 may be 4096. Other values for N1 are also contemplated. Cyclic extension block 202 adds cyclic extensions to allow for digital duplexing in the U1 and U2 bands and cancellation of Inter-Symbol Interference (ISI) in the U0 band. Transmit channel 220 carries the resulting signal for transmission.

In the embodiment of FIG. 2, the received signal is carried on receive channel 240. The received signal is split into two paths: one dedicated to processing the U0 band and another dedicated to processing the U1 and U2 bands. Turning first to the path dedicated to the U0 band, downsampler block 205 downsamples the received signal from the sample rate F2 of the received signal to a lower sample rate of F0. Exemplary, non-limiting values for F2 and F0 are 35.328 MHz and 276 KHz, respectively. Another exemplary, non-limiting value for F0 is 552 KHz. Downsampler 205 outputs the downsampled signal to subtractor 206.

Subtractor 206 also receives an input from echo canceller block 204. Downsample block 203 accepts a signal transmitted on transmit channel 220 as an input, downsamples it from a rate of F1 (the transmitter sampling rate associated with the digital-to-analog converter, by way of non-limiting example, 17.66 MHz) to a rate of F0, and outputs the result to echo canceller 204. Echo canceller 204 thus uses a downsampled signal based on the signal present on transmit channel 220 as a reference signal. Echo canceller 204 processes the reference signal and outputs a signal approximating the undesirable echo to subtractor 206. Subtractor 206 subtracts the approximated echo signal from the signal output from downsampler block 205 and outputs the resulting signal to TEQ 207.

TEQ 207 equalizes the receiver to eliminate ISI that may result from a long impulse response of the loop at low frequencies. More particularly, TEQ 207 shortens that channel impulse response interval such that it may accommodate the cyclic extensions. The output of TEQ 207 feeds into de-cyclic extension block 208, which removes cyclic extensions and synchronizes the U0 band symbol boundary with the far transmitter, thereby eliminating ISI. Finally, N0-point FFT block 209 receives the signal from de-cyclic extension block 208 and processes the U0 band signal for output. The quantity N0 may be, by way of non-limiting examples, 32 for systems that implement U0 as 25 KHz-138 KHz or 64 for systems that implement U0 at 25 KHz-276 KHz.

Note that, for processing the U0 band, both echo canceller 204 and TEQ 207 operate at a sampling rate of F0, which is significantly lower then the overall transmit signal rate (F1) and receive signal rate (F2). Operating at a low sampling rate significantly reduces the complexity of the receiver.

In the embodiment of FIG. 2, the output of subtractor 206 is used as a feedback control. In particular, the output of subtractor 206 may be considered as an error signal, which controls parameters associated with echo canceller 204. Echo canceller may, by way of non-limiting example, include an adaptive FIR filter whose coefficients are determined by the error signal as processed by techniques such as RLS, WRLS, LMS, NLMS, or Kalman filtering.

The receive path dedicated to processing the U1 and U2 bands in the embodiment of FIG. 2 is discussed presently. After branching from receive channel 240, the receive signal sampled at F2 is treated as a digital duplex signal and passed to low order high-pass filter (HPF) 210. HPF 210 eliminates the U0 signal, thereby preventing it from interfering with decoding the digitally-duplexed U1 and U2 signals. HPF 210 feeds into de-cyclic extension block 211, which synchronizes the symbol boundary of the U1 and U2 bands with the far transmitter. The output of HPF 210 serves as an input to N2-point FFT 212. The quantity N2 may be, by way of non-limiting example, 4096. FFT 212 processes the U1 and U2 band signals for output.

Several advantages arise from using one path for processing the U0 band and another for processing the U1 and U2 bands. As one example, separate paths reduce the need for low-pass filters. Fewer low-pass filters means less expense and complexity. As another example, separate paths allow for differential delays between the path that handles the U0 band and the path that handles the U1 and U2 bands. The ability to implement different delays in these different paths allows for more efficient synchronization between transmit and receive channels. Better synchronization, in turn, yields better performance.

Generally, embodiments of the present invention have the following advantages. The techniques taught herein may be used to cancel echo in VDSL and VDSL2. Existing prior art lacks suitable enabled techniques for efficient echo cancellation in systems that implement the VDSL or VDSL2 standards. Certain embodiments of the present invention use fewer low-pass filters and are therefore less complex than alternate techniques. Certain embodiments of the present invention benefit from reduced computational complexity compared to prior art techniques, due the an echo canceling structure that operates on a downsampled signal. Finally, certain embodiments of the present invention are capable of transmitting in three bands (e.g., U0, U1 and U2) simultaneously.

Embodiments of the present invention may be implemented using hardware, firmware, software, or any combination thereof. Standard computer hardware and/or software programming techniques may be used.

As used herein, the term "channel" means any conduit for information. By way of non-limiting example, a channel may be a particular bandwidth allocated on a particular set of wires. Note that many channels may exist on a single wire or pair of wires. For example, the transmit channel 120 and receive channel 140 of FIG. 1 may both be present on the same twisted pair of wires. Likewise, a single twisted pair of wires may carry both the transmit channel 220 and the receive channel 240 in the embodiment of FIG. 2.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A system for canceling echo, the system comprising:
   a transmitter configured to transmit a first signal on at least one band selected from the group consisting of: a first band and a second band;
   a first path configured to receive a second signal on a U0 band;
   a second path configured to receive a third signal on a band selected from the group consisting of: U1 band and U2 band, wherein the transmitter is capable of transmitting the first signal at the same time that the first path receives the second signal and the second path receives the third signal, and wherein the first path and the second path are configured to allow synchronization of the second signal substantially independently from synchronization of the third signal; and
   an echo canceller configured to cancel echo on at least the second signal.

2. The system of claim 1 further comprising a downsampler configured to receive a signal based on the first signal and further configured to provide a downsampled signal to the echo canceller.

3. The system of claim 1 further comprising a downsampler, wherein the echo canceller is configured to receive an error signal based on a fourth signal provided by the downsampler, wherein the error signal at least partially controls parameters associated with the echo canceller.

4. The system of claim 3 wherein the echo canceller comprises a finite impulse response filter and the parameters associated with the echo canceller comprise at least one finite impulse response coefficient.

5. The system of claim 3, wherein the error signal is identical to the fourth signal.

6. The system of claim 3 further comprising a subtracter configured to receive the fourth signal, wherein the error signal is based on an output of the subtractor.

7. The system of claim 1 wherein the first path and the second path are the same path.

8. The system of claim 1 further comprising a downsampler configured to receive the second signal, whereby the system processes the second signal independently from the third signal.

9. A method for canceling echo, the method comprising:
   transmitting a first signal on at least one band selected from the group consisting of: a first band and a second band;
   receiving a second signal on a U0 band;
   receiving a third signal on a band selected from the group consisting of: U1 band and U2 band, wherein the step of transmitting the first signal occurs simultaneously with the step of receiving the second signal and the step of receiving the third signal;
   canceling echo on at least the second signal;
   synchronizing the second signal with a transmitter; and
   synchronizing the third signal with a transmitter, wherein the step of synchronizing the second signal is substantially independent from the step of synchronizing the third signal.

10. The method of claim 9 further comprising: downsampling a signal based on the first signal to create a downsampled signal; and canceling echo on the downsampled signal.

11. The method of claim 9, further comprising: downsampling a signal based on at least the second signal to produce a downsampled signal; and generating an error signal based at least partially on the downsampled signal, wherein the step of canceling is at least partially controlled by the error signal.

12. The method of claim 11 wherein the error signal at least partially determines at least one finite impulse response coefficient.

13. The method of claim 11, wherein the downsampled signal is identical to the error signal.

14. The method of claim 11 further comprising: providing a signal based on the downsampled signal to a subtractor; wherein the error signal is based on an output from the subtractor.

15. The method of claim 9 further comprising: downsampling the second signal; and processing the second signal independently from the third signal.

16. A system for canceling echo in a digital subscriber line, the system comprising:
an inverse fast Fourier transform configured to accept signals on at least one band;
a cyclic extension generator operatively coupled to the inverse fast Fourier transform and configured to pass a transmitted signal to the digital subscriber line;
a channel coupled to the digital subscriber line and configured to simultaneously receive a first signal on a first band, a second signal on a second band, and a third signal on a third band, wherein the first band, the second band, and the third band are substantially disjoint;
a first downsampler operatively coupled to the channel and configured to produce a first downsampled signal of at least the first band;
a second downsampler configured to receive a signal based on the transmitted signal;
an echo canceller operatively coupled to the second downsampler and configured to produce a reference signal;
a subtractor configured to subtract the reference signal from the first downsampled signal and produce an error signal, wherein the error signal at least partially controls the echo canceller; and
an equalizer configured to accept a signal based on the error signal;
whereby the first band is processed separately from the second band and third band.

17. The system of claim 16 wherein the first band comprises U0, the second band comprises U1, and the third band comprises U2.

18. The system of claim 16 wherein the digital subscriber line comprises a VDSL line.

19. The system of claim 16 wherein the digital subscriber line comprises a VDSL2 line.

20. The system of claim 16 wherein the echo canceller comprises a finite impulse response filter.

21. The system of claim 20 wherein the error signal at least partially controls the echo canceller by determining at least one finite impulse response coefficient.

22. The system of claim 16, further comprising: first de-cyclic extension logic operatively coupled to the equalizer and configured to synchronize the second signal and the third signal with a transmitter; and second de-cyclic extension logic configured to receive a signal based on the second signal and the third signal and configured to synchronize the second signal and the third signal with a transmitter.

23. A method of canceling echo in a digital subscriber line, the method comprising:
transforming a signal on at least one band from a frequency domain to a time domain to produce a time domain signal;
adding cyclic extensions to the time domain signal to produce a time domain signal with cyclic extensions;
transmitting the time domain signal with cyclic extensions on a digital subscriber line;
receiving, over the digital subscriber line and substantially simultaneously, a first signal on a first band, a second signal on a second band, and a third signal on a third band, wherein the first band, the second band, and the third band are substantially disjoint;
downsampling at least the first signal to produce a first downsampled signal;
downsampling a signal based on the time domain signal with cyclic extensions to produce a second downsampled signal;
passing a signal based on the second downsampled signal to an echo canceller to produce a reference signal;
subtracting the reference signal from the second downsampled signal to produce an error signal, wherein the error signal at least partially controls the echo canceller; and
equalizing a signal based on the error signal;
whereby the first band is processed separately from the second band and third band.

24. The method of claim 23 wherein the first band comprises U0, the second band comprises U1, and the third band comprises U2.

25. The method of claim 23 wherein the digital subscriber line comprises a VDSL line.

26. The method of claim 23 wherein the digital subscriber line comprises a VDSL2 line.

27. The method of claim 23 wherein the echo canceller comprises a finite impulse response filter.

28. The method of claim 27 further comprising at least partially controlling the echo canceller with the error signal, wherein the error signal determines at least one finite impulse response coefficient.

29. The method of claim 23 further comprising:
removing cyclic extensions from the second signal and from the third signal; and
independently removing cyclic extensions from the first signal;
whereby the first signal is synchronized with a transmitter independently from the second signal and the third signal being synchronized with a transmitter.

* * * * *